United States Patent [19]

Ng

[11] Patent Number: 5,046,862

[45] Date of Patent: Sep. 10, 1991

[54] LINEAR MOTION BALL BEARING

[75] Inventor: Alison Ng, Fairfield, Conn.

[73] Assignee: Thomson Industries, Inc., Port Washington, N.Y.

[21] Appl. No.: 440,973

[22] Filed: Nov. 22, 1989

[51] Int. Cl.[5] ............................................ F16C 29/06

[52] U.S. Cl. ...................................................... 384/43

[58] Field of Search ............................ 384/43, 44, 45; 464/168

[56] References Cited

U.S. PATENT DOCUMENTS

| | | | |
|---|---|---|---|
| 4,206,951 | 6/1980 | Ernst et al. | 384/43 |
| 4,311,348 | 1/1982 | Olschewski et al. | 384/43 |
| 4,327,949 | 5/1982 | Borel | 384/43 |

*Primary Examiner*—Lenard A. Footland
*Attorney, Agent, or Firm*—Dilworth & Barrese

[57] ABSTRACT

A linear motion ball bearing is disclosed for providing relative linear motion in combination with a shaft. A housing has an axially elongated opening therethrough and an axially elongated generally tubular shaped ball retainer is positioned within the housing opening and defines a plurality of endless ball loops therein extending generally in the axial direction of the retainer. The retainer has a radially inner surface and a radially outer surface and the ball loops are spaced generally circumferentially about the retainer. Each loop contains a plurality of balls and has a first ball duct for a row of loaded balls and a second ball duct for a row of unloaded balls. Each first ball duct is open through the radially inner and radially outer surfaces of the cage, and each ball loop is arranged with the first ball duct next adjacent the first ball duct in the adjacent ball loop along one axially extending side and the second ball duct therein adjacent the second ball duct in the next adjacent ball loop along the other axially extending side. The housing defines a land opposite each pair of adjacent first ball ducts and extending radially inward, each land extending sufficiently radially inward and being of sufficient circumferential dimension to support the loaded balls of adjacent pairs of the first ball ducts and having a contoured relatively smooth surface for accommodating the loaded balls positioned within the corresponding opposed pair of respective first ball ducts of respectively adjacent ball loops. A uniquely shaped complex ball support surface connects each pair of ball ducts while maintaining constant floor to ceiling height about the balls to provide smooth, quiet operation of the bearing so as to combine with the uniform loaded ball arrangement to provide a unique bearing having improved load life performance and substantially quiet characteristics, while simplifying the manufacturing procedures.

17 Claims, 16 Drawing Sheets

LINEAR MOTION BALL BEARING

BACKGROUND OF THE INVENTION

1. Field of the Invention

The present invention relates to linear motion ball bearings. In particular, the ball bearings contemplated are of the type which are generally utilized to support a member, as for example, a carriage or pillow block on a shaft while providing linear motion to the supported member.

2. Description of the Prior Art

The present invention is directed to improvements in linear motion ball bearings. In particular, the improvement is specifically directed to a linear motion ball bearing of the type which facilitates supporting a member such as a carriage or pillow block on a support member such as an elongated shaft while facilitating slidable movement of the pillow block along the shaft.

Bearings of the type contemplated by the present invention generally include an outer housing and an inner cage which defines ball loops for containing bearing balls. The ball loops include open portions which facilitate load transfer between the outer housing of the bearing and a supporting shaft while permitting the load balls to leave the load ball areas and return to unloaded ball areas. In many instances, such bearings have been structured to provide linear motion but have not been constructed in a manner which facilitates uniform distribution of loading, uniform wear, quiet and smooth operation and overall bearing performance. Attempts have been made to improve bearing performance; however, to date, although such attempts have been somewhat successful they are not believed to have raised bearing performance to the desired levels.

In general, recent developments in the bearing art have been directed to the provision of various improvement features such as, for example, race inserts positioned to retain the balls in position. Ball retainers have been proposed to arrange the balls to travel in specific raceways in an improved and efficient manner. Guides have been provided and configured to facilitate ball transfer between ball channels. However, as noted, a linear motion ball bearing has yet been proposed which facilitates uniform load distribution and wear, while providing quiet operation with transfer of balls between loaded and unloaded paths with minimum chatter and vibration. I have invented a linear motion ball bearing which provides improved such characteristics and operational features.

SUMMARY OF THE INVENTION

Linear motion ball bearing for providing relative linear motion in combination with a shaft, which comprises housing means having an axially elongated opening therethrough, an axially elongated generally tubular shaped ball retaining means positioned within the housing means opening and defining a plurality of endless ball loops therein extending generally in the axial direction of the ball retainer. The retaining means has an inner surface and an outer surface radially displaced from one another. The ball loops are spaced circumferentially apart about the ball retaining means. Each loop contains a plurality of balls with each loop having a first ball duct for a row of loaded balls and a second ball duct for a row of unloaded balls. Each first ball duct is open through the inner and outer surfaces of the ball retaining means, and each ball loop is arranged with the first ball duct next adjacent the first ball duct in the adjacent ball loop along one axially extending side and the second ball duct therein is adjacent the second ball duct in the next adjacent ball loop along the other axially extending side. The housing defines a land opposite each pair of adjacent first ball ducts and extends inwardly, each land extending sufficiently inward and being of sufficient circumferential dimension to support the loaded balls of adjacent pairs of first ball ducts and having a contoured relatively smooth surface for accommodating the loaded balls positioned within the corresponding opposed pair of respective first ball ducts of respectively adjacent ball loops. Preferably, each contoured relatively smooth surface has an arcuate configuration. Also, preferably, land for supporting loaded balls is dimensioned and configured such that balls in adjacent loaded ball ducts become unloaded upon movement away from each first ball duct and toward the second ball duct of the respective ball loop.

In the preferred embodiment, each ball support land is formed integral with the housing and the housing contains an outer wall portion and an inner wall portion spaced radially inward of the outer wall portion. The ball support land is configured to define an arcuate central portion to support loaded balls and ramp portions extending from the arcuate portion towards the wall portion of the housing at least at each axial end portion. Also, the ball support land is preferably of a length generally greater than the width. Preferably, the arcuate loaded ball surface extends from the inner surface of the outer housing and defines ramped surfaces extending axially at least along the length of each land. Each ramp portion adjacent the width portion of each land extends in a transverse direction and from the ball support surface toward the inner surface portion of the housing and forms a generally acute angle with the inner surface portion of the housing.

In a preferred embodiment, the loaded ball duct defines a loaded ball zone approximately equal in length to the corresponding open portion extending from the radially inner to radially outer surface of the ball retaining means. The interface between each the loaded ball surface portion of each land and the adjacent transverse ramp portion corresponds generally with the end of the loaded ball zone. Further, the cross-section of each ball duct is generally semi-circular and is related to the diameter of each ball. The ball retaining means is in the form of a cage having ramped surfaces configured for engagement with each axially extending ramp adjacent the longer side of each land so as to fix the circumferential position of the cage within the outer housing.

Another feature of the invention relates to the height of each unloaded ball duct which is defined by the dimension between the base of the unloaded ball duct and the corresponding opposed inner surface of the outer housing. The height of this duct is preferably continuously maintained at a substantially fixed dimension slightly greater than the diameter of each ball between the end limit locations of each loaded ball zone. Each ball loop is comprised of two opposed elongated straight ball ducts connected at each end by arcuate ball paths, and each loaded and unloaded ball duct extends over an axial dimension approximately equal to the straight elongated axial portion of each ball loop. Further, each ball duct portion beyond the open portion of the loaded ball duct is contoured such that each ball first rises to a level radially outward of the loaded ball land surface beyond the end portions of each loaded ball duct. Preferably, the ball cage is fabricated of a polymeric material, i.e. synthetic plastic such as nylon, acetal, polyacetal, polycarbonates, polyamides, etc.

According to a preferred arrangement, the linear motion ball bearing for providing relative linear motion in combination with a shaft comprises a housing having an axially elongated opening therethrough, an axially elongated generally tubular shaped ball retainer positioned within the housing opening and defining a plurality of endless ball loops therein extending generally in the axial direction of the ball retainer, the ball retainer inner surface and an outer surface radially displaced from one another, the ball loops spaced circumferentially apart about the ball retainer and each containing a plurality of balls. Each loop has a first generally axially extending ball duct for a row of loaded balls and a second generally axially extending ball duct for a row of unloaded balls. Each first ball duct is open through the inner and outer surfaces of the ball retainer, and each ball loop is arranged with the first ball duct next adjacent the first ball duct in the adjacent ball loop along one axially extending side and the second ball duct therein adjacent the second ball duct in the next adjacent ball loop along the other axially extending side. The housing defines a land opposite each pair of adjacent first ball ducts extending inwardly and integral therewith, each land extending sufficiently inwardly and being of sufficient circumferential dimension to support the loaded balls of adjacent pairs of first ball ducts and having a contoured relatively smooth surface for accommodating loaded balls positioned within the corresponding opposed pair of respective first ball ducts of respectively adjacent ball loops. Each relatively smooth ball support surface is connected to the inner surface portion of the outer housing by a ramped surface on at least two end portions to thereby accommodate and support ball movement between the loaded and unloaded ball ducts.

In the preferred embodiment, the loaded and unloaded ball ducts are connected by an arcuate ball duct having a ball support surface comprising an arcuate ball path, the ball path being defined by an arcuate ball support surface comprising at least three continuous curved surfaces which support the balls such that the center of the ball approximately defines a locus comprised of three correspondingly continuous curves approximately as follows:

(a) a first curve defined by the intersection of a first control surface which is an imaginary control cylinder of diameter at least approximately one ball diameter and its central axis extending generally perpendicular to the chord of each land end, and a second control surface which is an imaginary control cylinder of diameter approximately one ball diameter and having its central axis tangential to the loaded ball surface of each land and generally orthogonal to the central axis of the sleeve;

(b) a second curve defined by the intersection of a third control surface which is a conical surface concentric and parallel with the transversely extending end ramp and closest thereto and spaced orthogonally inward therefrom approximately ½ ball diameter, and the first mentioned imaginary control cylinder; and (c) a third curve defined by the intersection closest to the land of a fourth control surface which is a cylindrical surface concentric with the inner surface of the housing and spaced radially inward therefrom approximately ½ ball diameter, and the first mentioned imaginary control cylinder.

In the preferred embodiment the diameter of the first control cylinder is approximately 1½ ball diameters and the central axis extends through the intersection between each side ramp and the inner surface of the sleeve. The location of the central axis of this cylinder may vary depending upon the ball location and the ball diameter; however in no event can the surface of the cylinder distal from the ball be located inward of the intersection between each side ramp and the inner surface of the sleeve. Also, if the ball support land is flat, the chord will be coincident with the land.

The ball travel centerline which defines the locus of the center of the arcuate portion of the cross-section of the arcuate ball duct is comprised of at least three correspondingly continuous curves. Ideally, the ball support surface is the surface generated by a non-rotating ball travelling such that the locus of the center follows the specifically defined curves. However as a practical matter, the actual surface must be slightly larger to accommodate rolling motion of the ball.

DETAILED DESCRIPTION OF THE PREFERRED EMBODIMENTS

Figure 1:
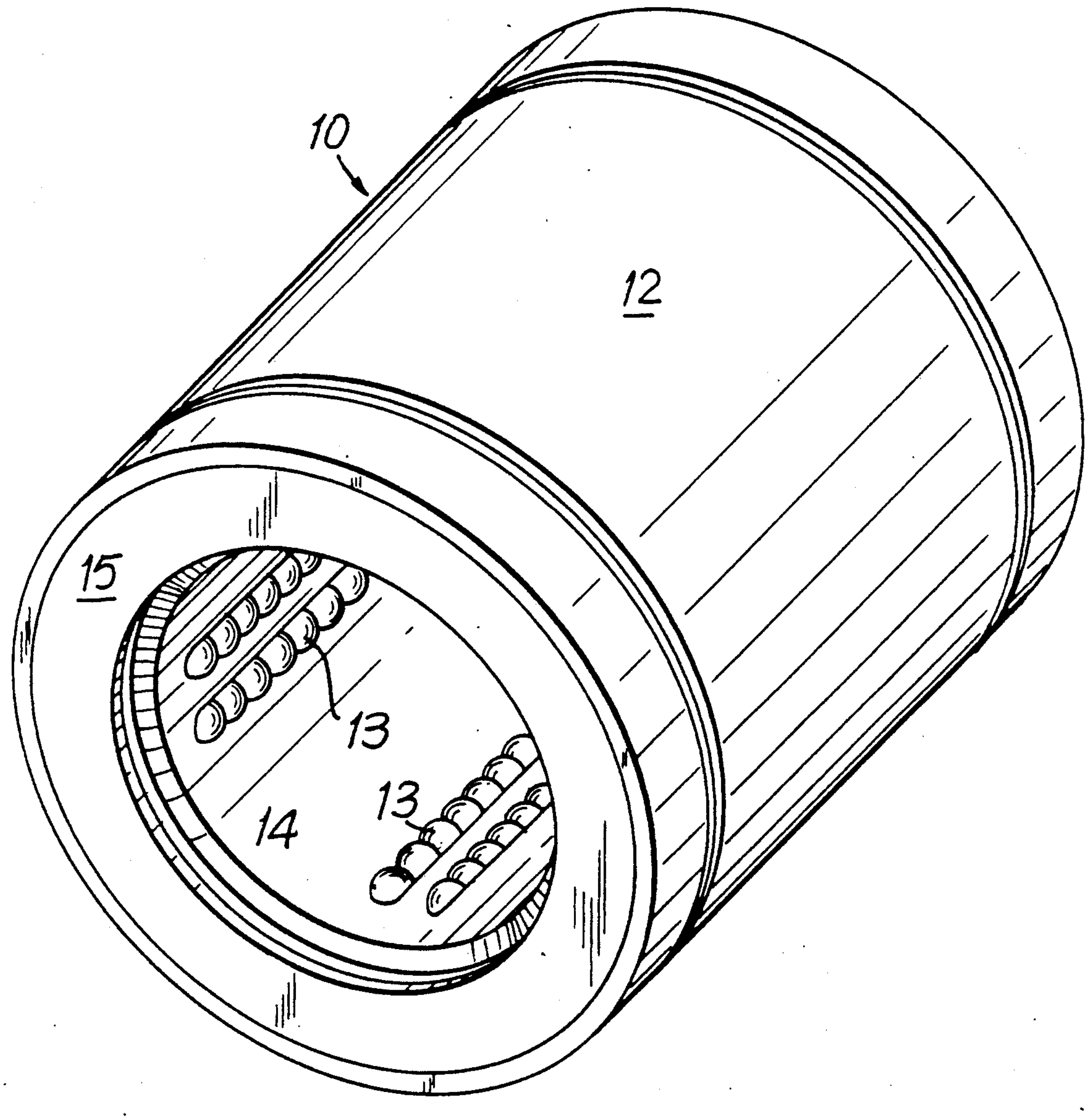
FIG. 1 is a perspective view of a linear motion ball bearing constructed according to the present invention.

Referring to FIG. 1 there is illustrated a perspective view of the linear motion ball bearing 10 constructed according to the invention. The bearing includes outer housing 12 which is elongated and tubular in configuration. A ball retainer—or cage—14 is positioned within the housing and defines a plurality of endless ball loops spaced about the circumference thereof and extends axially of the housing. The ball retainer contains a suitable plurality of bearing balls 11 which are unloaded and balls 13 which are loaded. The balls are identical to each other except that a ball is unloaded when it is positioned in an unloaded ball duct and it is loaded when it is positioned in a loaded ball duct. Preferably as shown, pairs of adjacent ball loops are generally evenly distributed about the ball retainer.

Figure 2:
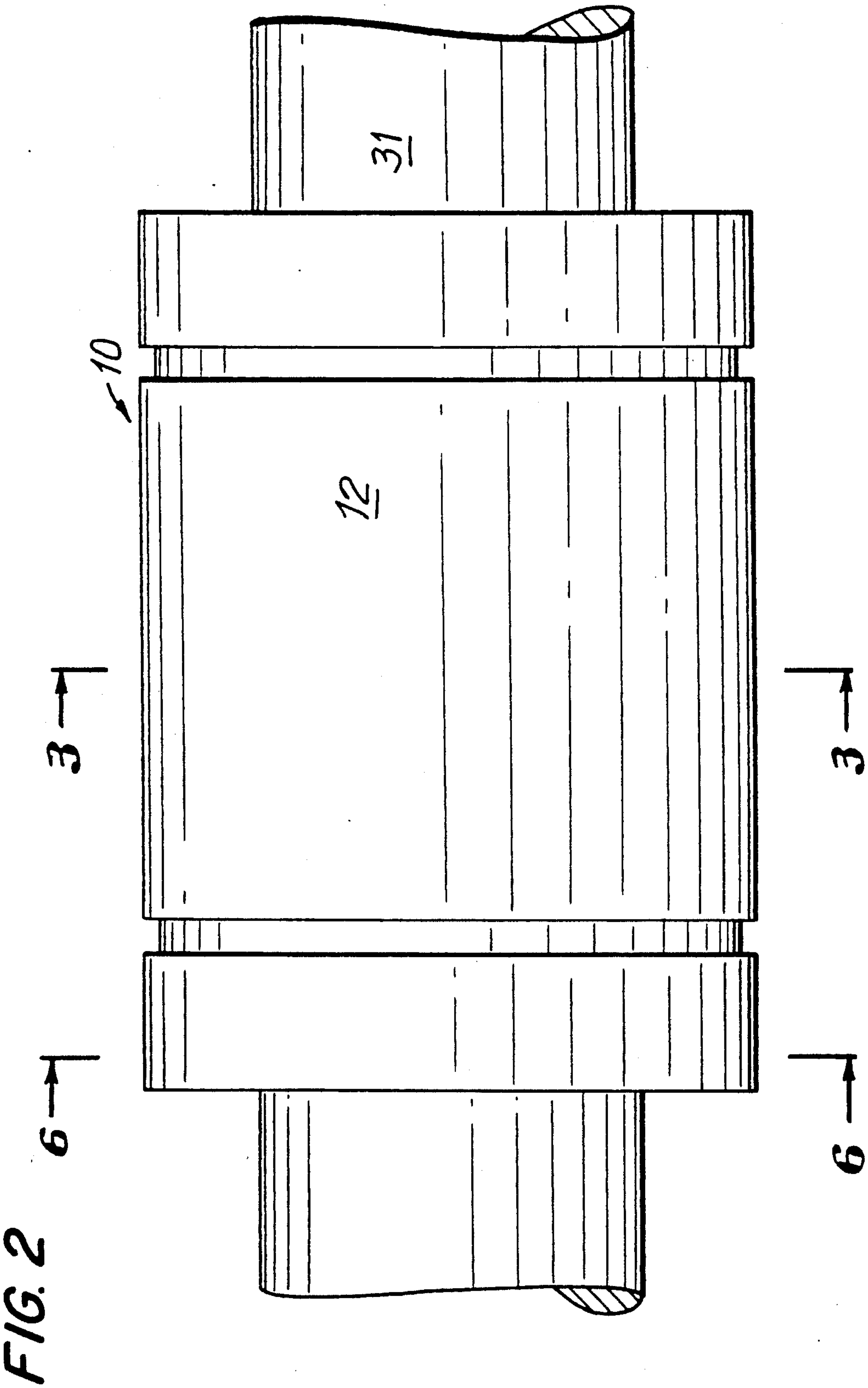
FIG. 2 is an elevational view thereof.
Figure 3:
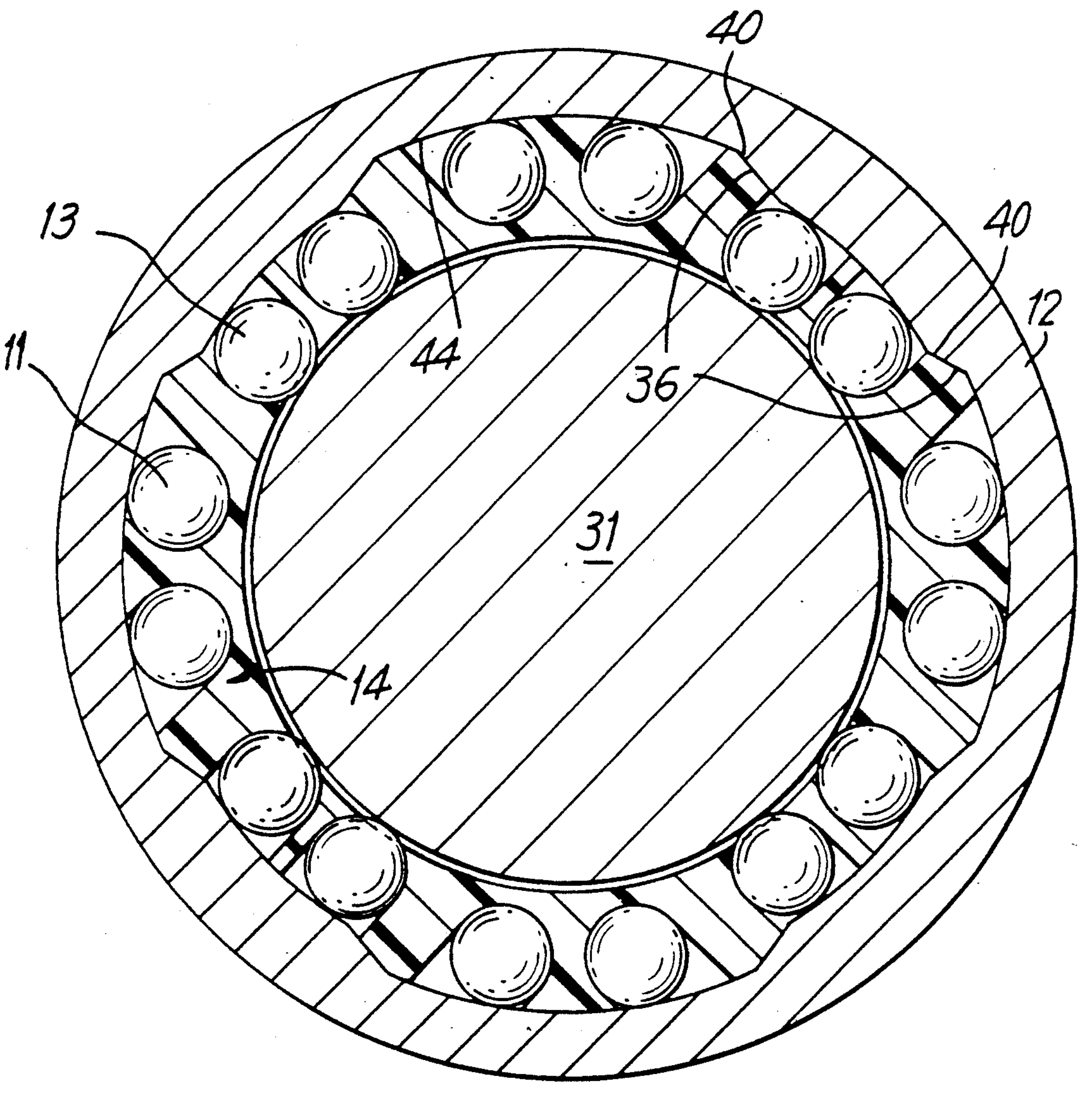
FIG. 3 is a cross-sectional view of the ball bearing shown in FIG. 1 taken along lines 3—3 of FIG. 2.
Figure 4:
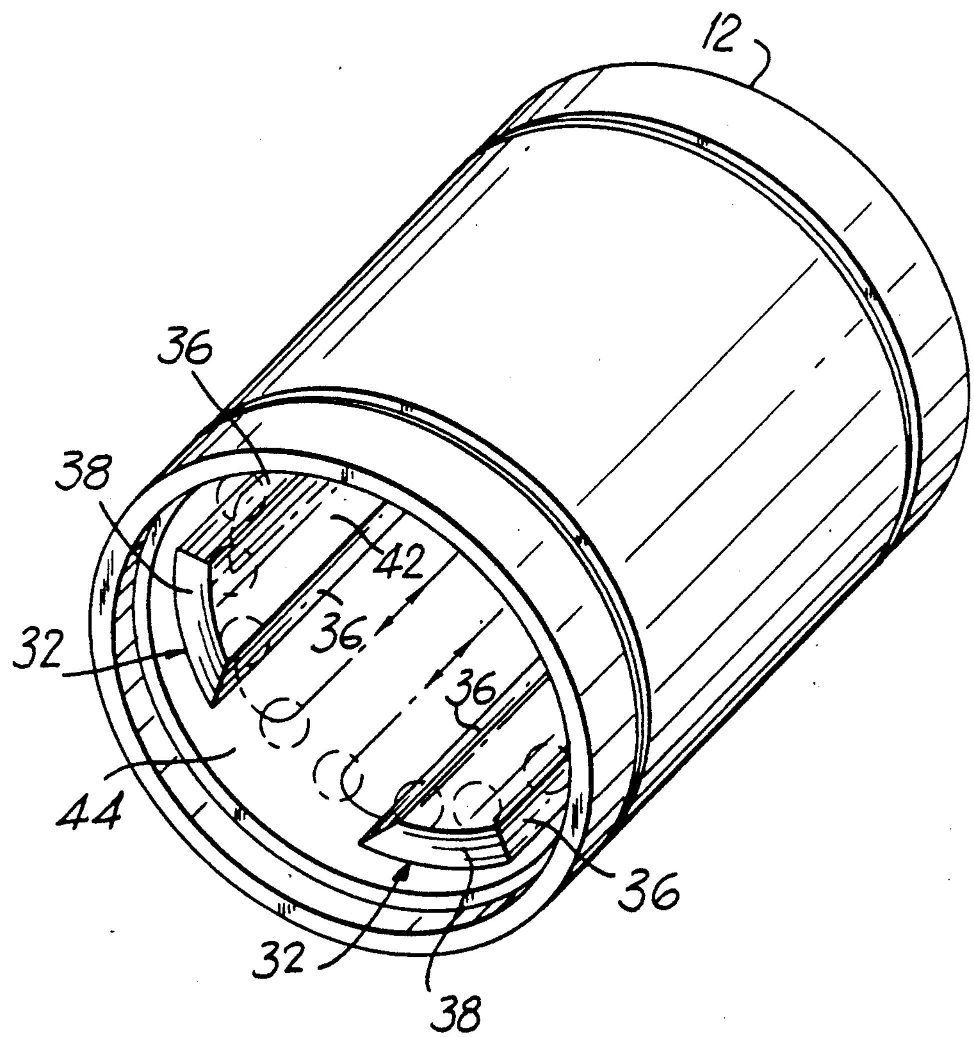
FIG. 4 is a perspective view of the outer housing of the linear motion ball bearing of FIG. 1 illustrating the inwardly extending loaded ball support lands.
Figure 5:
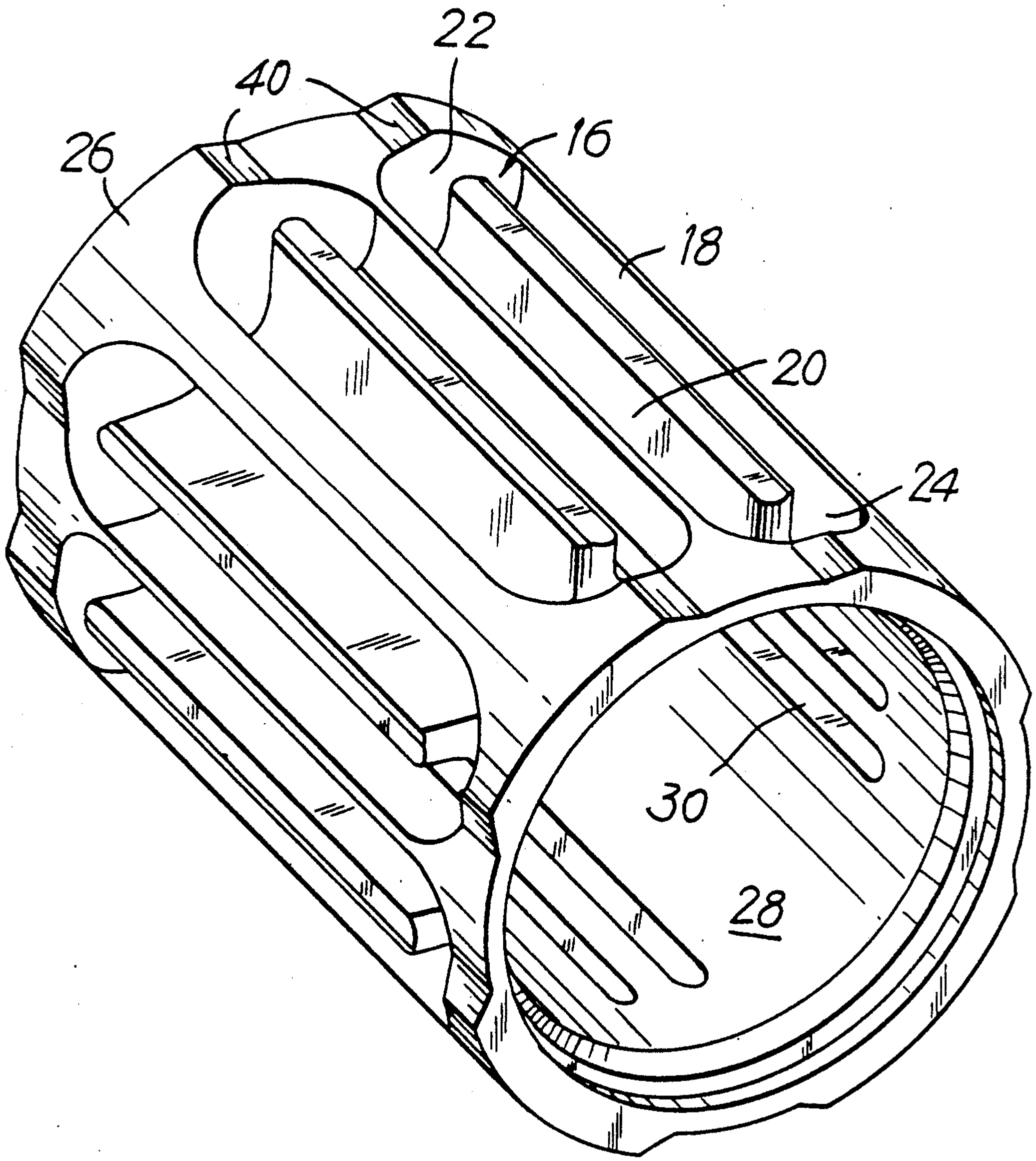
FIG. 5 is a perspective view of the ball retainer of the linear motion ball bearing shown in FIG. 1 illustrating the ball loops which carry loaded and unloaded balls.

An exemplary cage retainer 15 is shown in FIG. 1 in schematic form. An identical retainer (not shown) is positioned on the opposite side of the bushing bearing. Preferably, the cage retainers are welded on the inner side (not shown), as by ultrasonic welding techniques, to the ball cage on each side of the cage. Thus, the retainers are preferably constructed of a material ultrasonically compatible with the material of the cage. The outer housing 12 is best illustrated in FIG. 4 and the ball cage 14 is best illustrated in FIG. 5. The combined outer housing 12 and ball cage 14 are best illustrated in FIGS. 1 and 3. FIG. 2 is a plan view of the outer housing.

Referring now to FIG. 3 there is illustrated a cross-sectional view of the linear motion ball bearing shown in FIG. 1. The outer housing 12 is preferably constructed of a suitable bearing material such as bearing steel. Alternatively, such suitable materials as stainless steel, ceramics, etc., may be used. The ball cage 14 is preferably constructed of a material having sufficient strength to retain the balls in their loaded and unloaded positions and to provide ball ducts which are sufficiently smooth to permit relatively free and unimpeded movement of the balls between the loaded and the unloaded ball ducts. A polymeric material is preferred. Synthetic plastics such as nylon, acetal, polyacetal, polycarbonates or polyamides in general, may be used and are in fact preferred. Other suitable materials will be known to persons skilled in the art.

Referring now to FIG. 5, there is shown a perspective view of the ball cage 14 shown in FIGS. 1 and 3. The ball retainer 14 includes a plurality of endless ball loops 16 extending axially of the cage. Each loop 16 contains a loaded ball duct 18 and an adjacent unloaded ball duct 20 connected by respective arcuate loops 22 and 24 which define an arcuate ball path having a three part "floor". The cage is defined by an outer surface 26 and an inner surface 28 of circular cross-section spaced radially inward of the outer surface 26. Generally as shown, the outer surface is somewhat irregular and discontinuous, i.e. it includes the surface of each land between loaded and unloaded ball ducts. Each loaded ball duct is open through the radial inner surface by axial slot 30 to permit balls positioned therein to engage a working shaft 31, shown in FIG. 2, and the respective inner loaded ball surface of the outer housing 12 as will be described in further detail hereinbelow.

Figure 6:
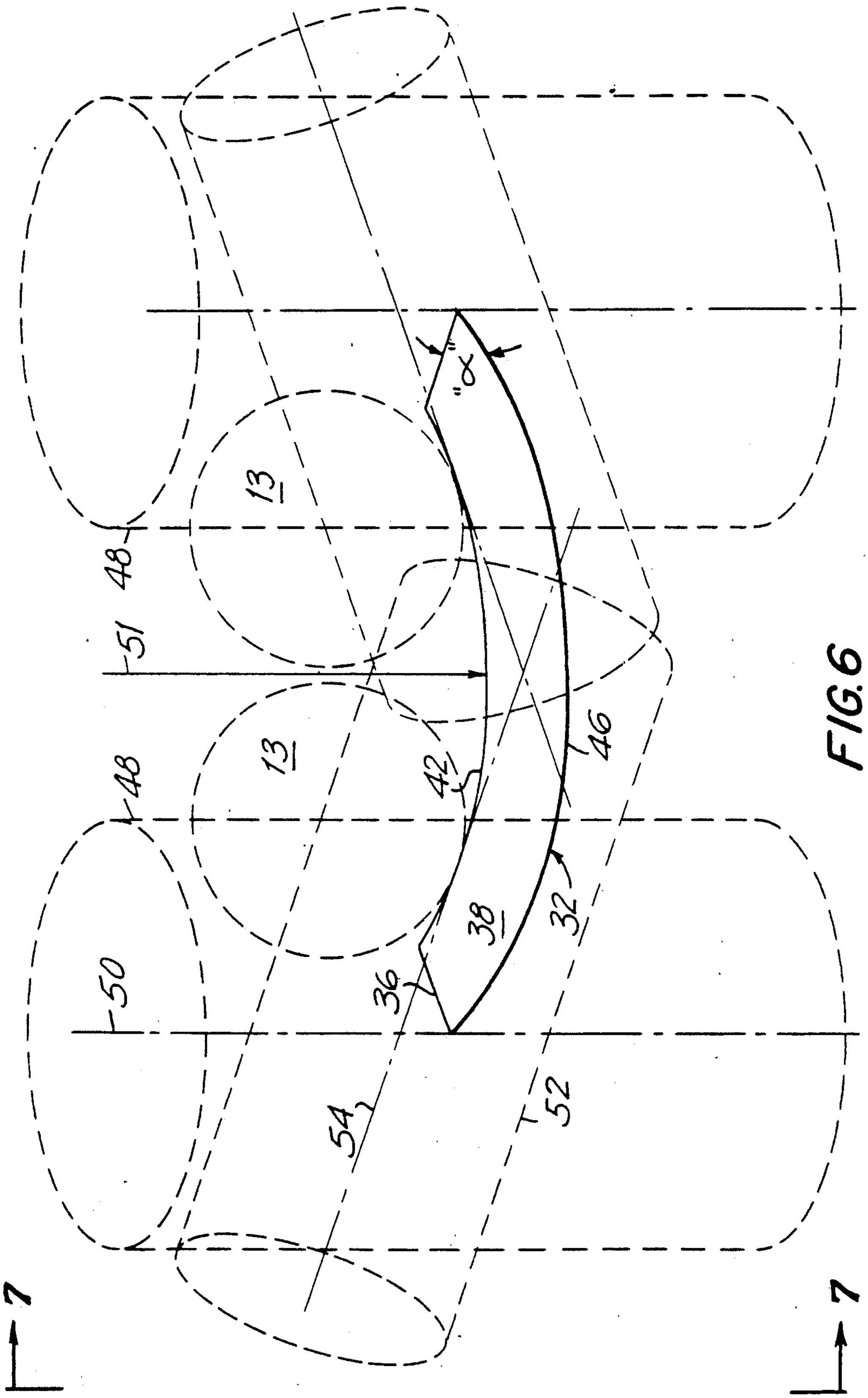
FIG. 6 is an enlarged schematic "cross-sectional" -type representation of the outer housing showing a typical ball support land extending inwardly of the outer housing, and illustrating the hypothetical control surfaces which define the locus of the ball center when travelling along the first portion of the "floor" of a three part ball path connecting the loaded and unloaded ball ducts in the ball retainer.

Referring once again to FIG. 4, the outer housing 12 contains lands 32 which extend inwardly from housing inner surface 44, and are positioned opposite each ball loop when the ball retainer 14 is positioned within the housing. Each land 32 contains an arcuate centrally positioned elongated loaded ball surface 42 which is polished for contact with the balls and which supports the loaded balls when positioned in the opposed respective loaded ball duct. Each land is surrounded on all sides by a ramped surface designated as 36 on the axially extending sides and 38 on the transverse sides as shown in FIG. 4. The ramped surfaces form a generally acute angle "a" with the inner circular surface 28 of the outer housing 12 as shown in FIG. 6. The end ramps which extend transversely of the housing are dimensioned and oriented to accommodate ball transfer between the loaded ball duct of a ball loop and the unloaded ball duct of the same loop.

As shown schematically in FIG. 3, the balls in the loaded ball duct of adjacent loops are in engagement with a particular bearing support surface of the respective land and travel between the loaded and the unloaded ball ducts via the arcuate end loops of each ball loop as noted. The transversely extending ramped surfaces 38 at each end of a land 32 accommodate ball travel between the ducts. As shown in FIGS. 3 and 5, the ramped surfaces which extend axially of the cage serve to key the cage in a circumferentially fixed position by providing oppositely disposed ramped surfaces 36 on each side of each land 32 which engage with correspondingly dimensioned and opposed ramped surfaces 40 formed by ball retainer 14. Similarly, each elongated slot 30 in retainer 14 is dimensioned to terminate at a location which approximately corresponds to the interface between the transverse ramped surface 38 and the polished arcuate surface 42. The precisely defined contour of the ball path in the radial loops 22, 24, as will be described hereinbelow, permit each ball to enter the corresponding radial end loop 22, 24 and to travel therein with a minimum of vibration and chatter.

The adjacent positioning of the loaded ball ducts of adjacent ball loops so as to be supported by a common ball support land is believed to represent a significant and novel advance in the art for several reasons. One such reason is the fact that the load on the shaft is substantially evenly distributed, while load bearing capability is thereby increased. This is due to the pairing of loaded ball ducts in close adjacent relation. Further, the uniformity of the arrangement lends itself to distributed wear throughout the bearing life thus reducing the need to periodically rearrange the components where loading is consistently in the same direction.

The precise contours of the ball ducts 18, 20 and the arcuate end portions 22, 24 which connect these ducts are also believed to be a significant feature of the present invention. These surfaces will now be described with reference to FIGS. 3–8.

Figure 14:
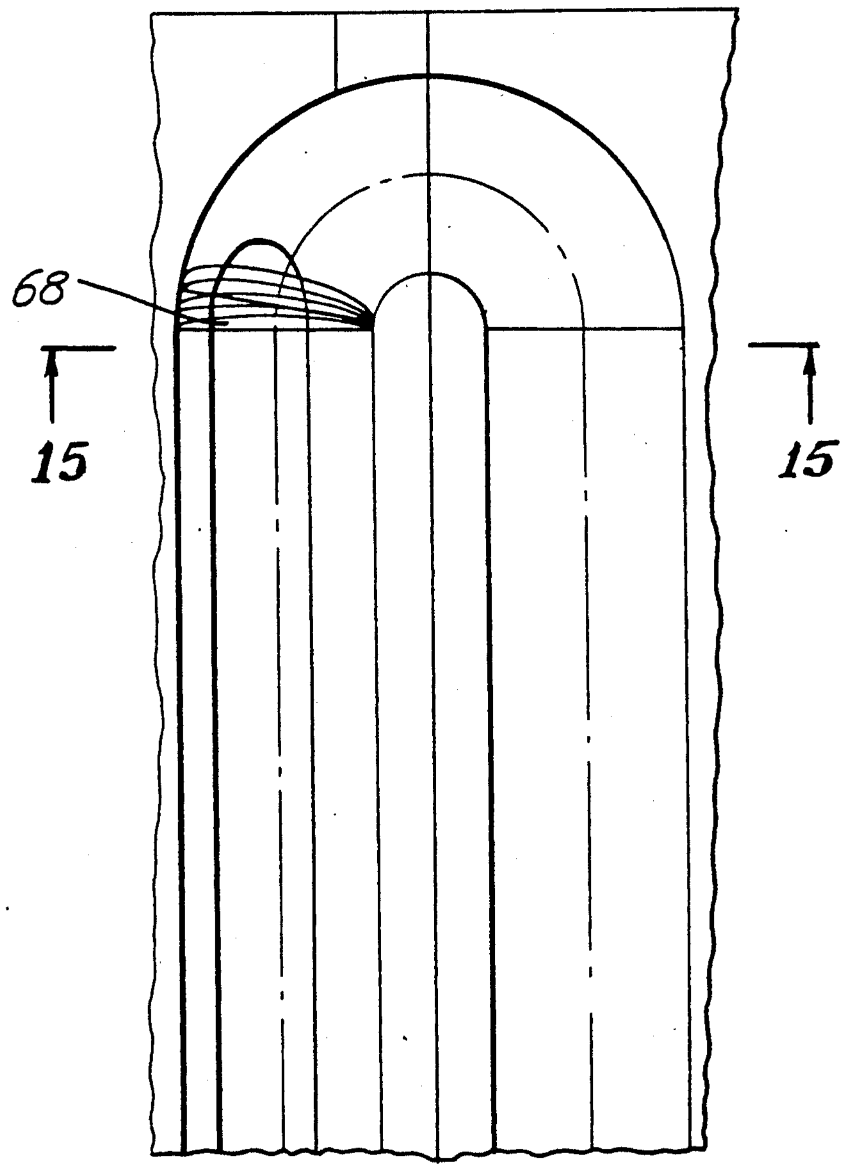
FIG. 14 is a top plan view of a part of a typical ball loop illustrating the envelope of the ball path in the ball-lift zone exiting the loaded ball duct.
Figure 15:
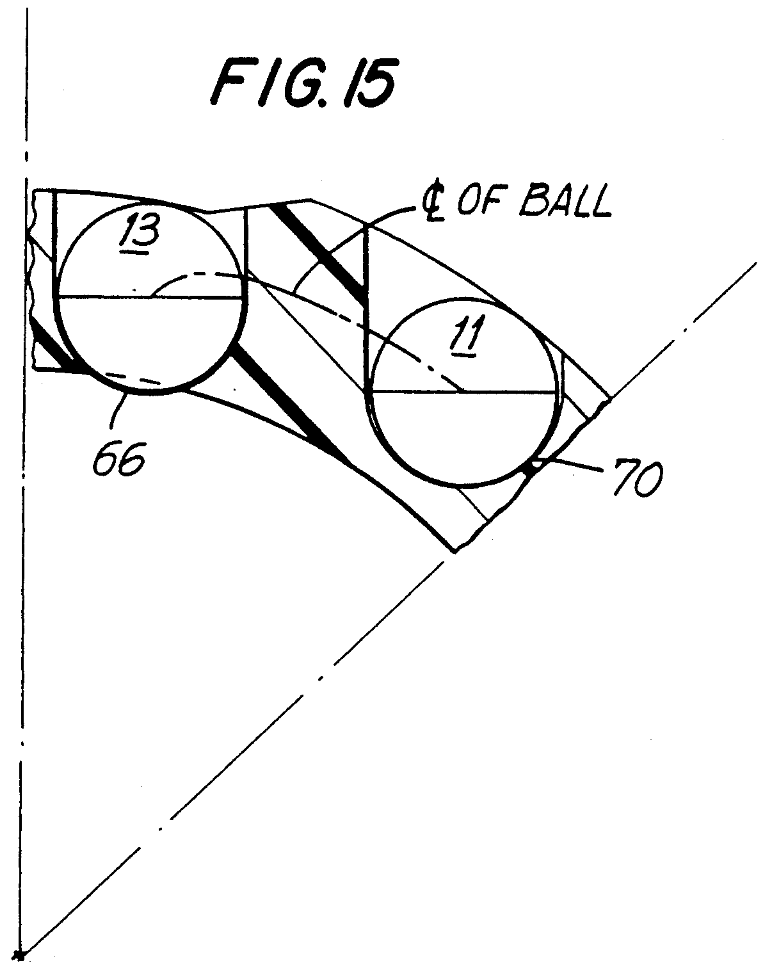
FIG. 15 is a cross-sectional schematic view of a ball in a loaded ball duct and a ball in the corresponding adjacent unloaded ball duct of the same ball loop.

The surface which connects each loaded and unloaded ball duct is a relatively complex curved surface formed in the ball cage so as to accommodate rolling transfer of balls between the ducts. The precise curved surface is dimensioned and configured to maintain a relatively constant "ceiling to floor" height above and below each ball as it travels between the loaded ball duct and the unloaded ball duct. In fact, the "ceiling" above the ball between the loaded and unloaded ball paths is defined by the transversely extending ramp 38 at each end of axial land 32 and the inner surface 44 of housing 12 as shown in FIG. 4. It has been determined that in order to maintain a constant "floor to ceiling" height about each ball along the arcuate path of travel between the axially extending ball paths, it is necessary to provide a relatively complex surface between the point where each loaded ball duct 18 ends and the beginning of the floor of the unloaded ball duct 20. Such surface is described by the curves defined by the surfaces shown in FIGS. 6–8 and are particularly illustrated by the ball envelopes and in FIGS. 9–14. An end view of this connecting loop is shown in FIG. 15.

As a practical matter it has been found that the surface required to carry the ball between the loaded and unloaded ball ducts is best defined as three separate and individual curved surfaces which form a continuous arcuate curved "floor" for the balls which vary in "height" so as to continuously maintain the distance between the "floor" and the "ceiling" (i.e. the transverse ramp 38 and housing inner surface 44) substantially constant.

The three-part arcuate surface forming a ball path between the loaded and unloaded ball ducts is best described with reference to FIGS. 6–8 by defining the ball travel centerline which is the locus of the center of the ball when travelling within the semi-circular portion of the cross section of the arcuate ball duct which is comprised of three substantially continuous curves. For convenience of the present description, the curves there which define the locus of the ball center will be described in terms of the intersection of certain geometric surfaces which will be referred to herein as "hypothetical" or "imaginary" control surfaces. Such surfaces are geometric surfaces in space which define the requisite curves by their intersections with each other. Generally, the dimensions of these surfaces are specified as a function of the dimensions of the components of the bearing as will be seen in the description which follows, i.e. the balls, the housing dimensions, etc.

In this regard, FIG. 6 is an enlarged schematic 15 cross-sectional view taken along lines 6—6 of FIG. 2 illustrating a typical land 32 which extends radially inward from inner surface 44 of housing 12. The transverse conical ramped surface 38 extends from the arcuate surface 42 of land 38 and intersects the surface 44 of housing 12 as shown at 46. Since the imaginary control surfaces on each side of the land are identical, reference will be made to the control surfaces on one side in connection with the drawings.

The first portion of the complex curve which defines the first part of the surface connecting the ball ducts will be described with reference to FIG. 6. A primary imaginary control cylinder 48 is shown in stippled lines and extends as shown with respect to the land 32 and has its center line 50 preferably extending through the intersection between the axial ramp 36 and the inner surface 44 of housing 12. The imaginary control cylinder is of a diameter approximately one and one half (i.e. 1½) ball diameters and extends parallel to a radius line 51 as shown which extends to the mid point of the land 32. A second imaginary control cylinder 52 is also shown in stippled lines and extends in a generally orthogonal direction with respect to the center axis of the housing and has its central axis 54 tangent to the arcuate working surface 42 of the land 32 at the loaded ball path as shown, i.e. the point of contact between the ball and the land. In fact the point of tangency is located at the land end, i.e. where the arcuate land meets the transverse conical ramp 38. This cylinder 52 is approximately one ball diameter as shown. By "orthogonal" I refer to the relationship of the respective axes whereby they are generally normal to each other, but do not necessarily intersect.

A first portion of the "floor" of the ball path between the loaded and unloaded ball ducts is characterized as the "ball pick-up region" and is defined as the floor portion of the surface generated by the ball when travelling such that the locus of the ball center coincides with the curve defined by the intersection of primary control cylinder 48 and second control cylinder 52.

Figure 7:
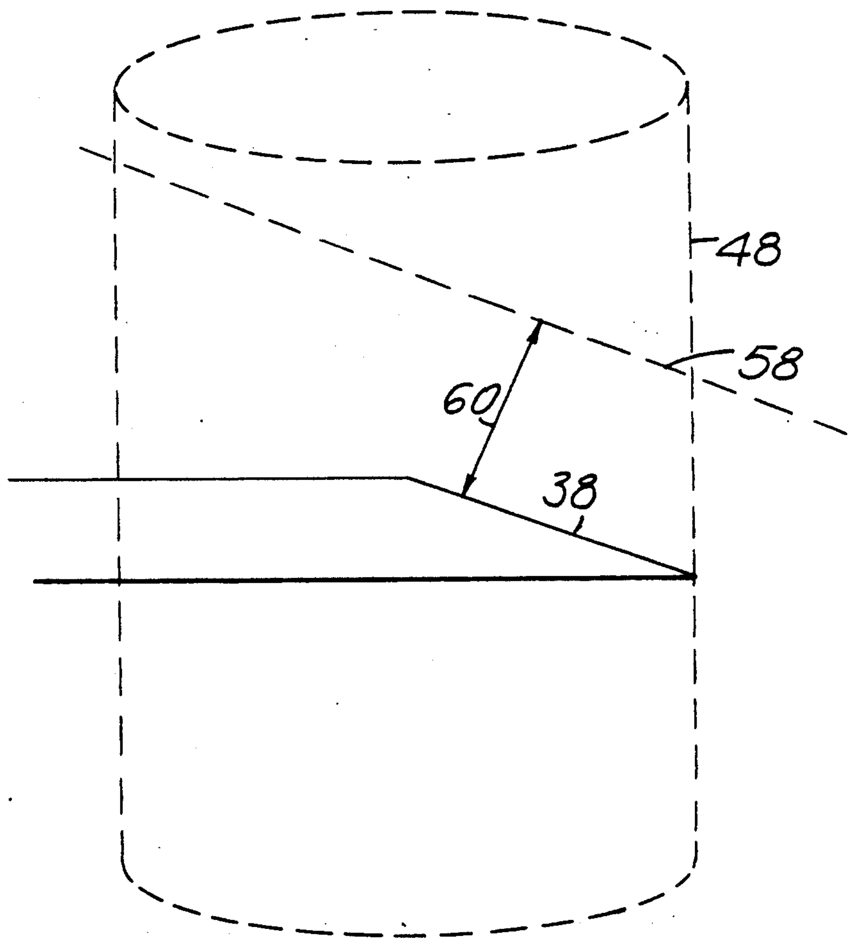
FIG. 7 is an enlarged view taken along lines 7-7 of FIG. 6, illustrating the hypothetical control surfaces which define the locus of the ball centerline when travelling along the mid-portion of the "floor" of the three part ball path connecting the loaded and unloaded ball ducts.

The second portion of the "floor" of the ball path extending aft of the "ball pick-up" region in a direction away from the loaded ball duct is defined by the surface generated by the ball when travelling such that the locus of the ball center coincides with the curve defined by the intersection between the following two imaginary control surfaces which are illustrated in FIG. 7. The first control surface is the primary imaginary—or hypothetical—control cylinder 48 shown in FIG. 6 and described above in connection with the initial ball pick-up region. The view of imaginary control cylinder 48 shown in FIG. 7 is a side view taken along lines 7—7 of FIG. 6. The third imaginary control surface is a surface shown in stippled lines in FIG. 7 at 58 and is a conical surface which is "concentric" and "parallel" to the conical ramp surface 38 but removed "orthogonally" outward from the ramp surface 38 by dimension 60 equal to approximately ½ the ball diameter The second portion of the floor of the ball path between the loaded and unloaded ball ducts is defined as the floor portion of the surface generated by the ball when travelling such that the locus of the ball center coincides with the curve defined by the intersection between primary imaginary control cylinder 48 and third imaginary conical surface 58.

The third section of the floor of the ball path between the loaded and unloaded ball ducts is defined by the intersection between the imaginary control surfaces shown in FIG. 8 which will now be described.

Figure 8:
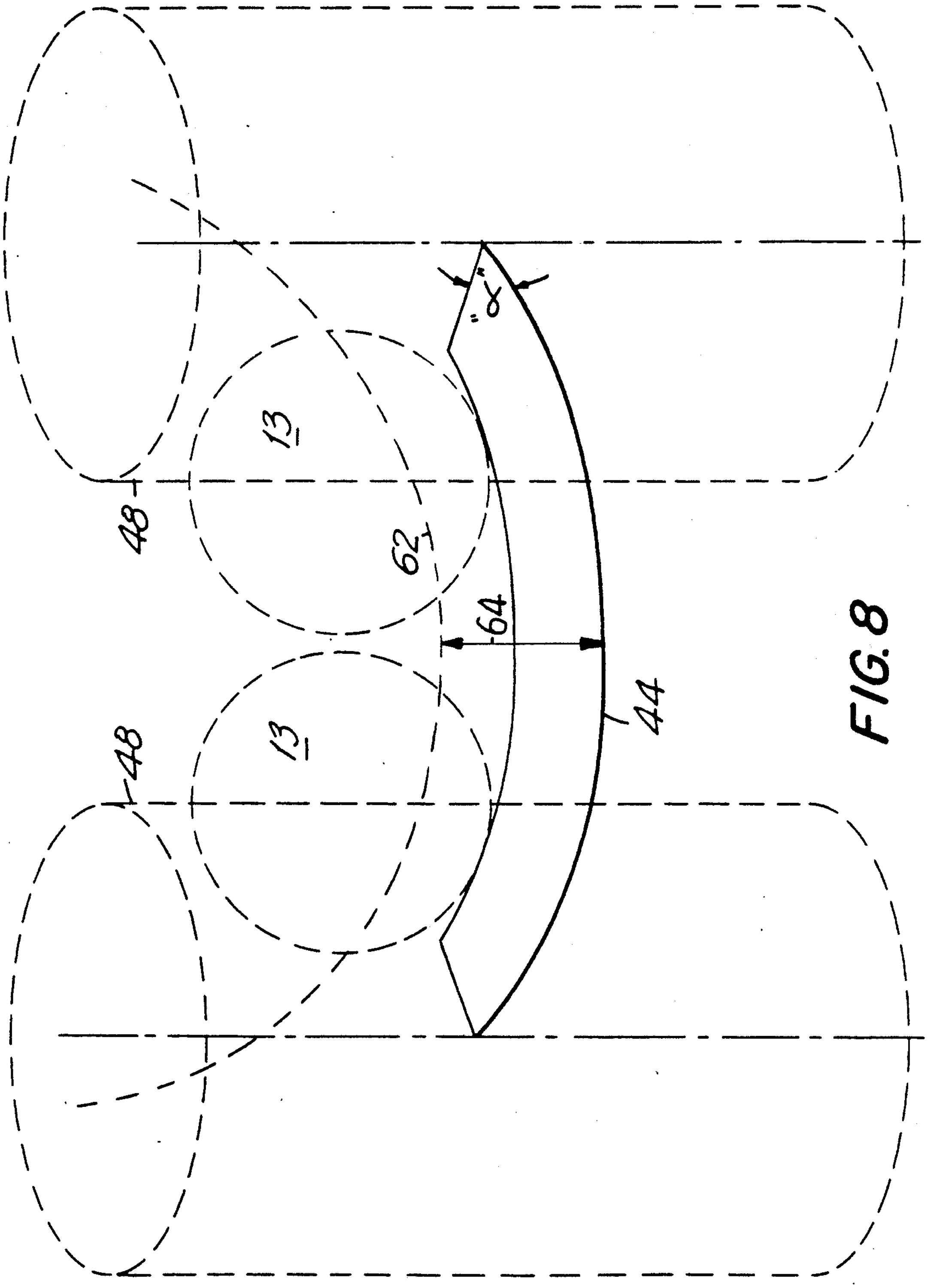
FIG. 8 is an enlarged schematic "cross-sectional" -type representation similar to FIG. 6, illustrating the hypothetical control surfaces which define the locus of the ball centerline when travelling along the third portion of the floor of the three part ball path connecting the loaded and unloaded ball ducts.

Referring to FIG. 8 there is illustrated an enlarged schematic "cross-sectional" view similar to FIG. 6, illustrating the same imaginary control cylinders 48 shown in FIG. 6. In addition, a fourth imaginary control surface 62 is shown which is circular and concentric with the circular inner surface 44 of the outer housing 12, but spaced inwardly of surface 44 by dimension 64 equal to ½ ball diameter.

The third and final portion of the complex "floor" or surface between the loaded and unloaded ball ducts is thus defined as the floor portion of the surface generated by the ball when travelling such that the locus of the ball center coincides with the curve defined by the intersection between primary imaginary control cylinder 48 and imaginary circular control surface 62 shown in FIG. 8.

Thus, the three part surface which supports the balls between the loaded and unloaded ball ducts has been defined. As a practical matter, portions of each of the three above defined surfaces are selected so as to define a continuous ball path or "floor". It has been found that the resulting surface maintains substantially constant, the "floor to ceiling" height surrounding each ball between the point where the ball exits the loaded portion of the loaded ball duct and returns to the unloaded ball duct. The substantially constant height has been found to be ideally adapted for the balls to minimize chatter and vibration in the movement between the ducts. Further it should be noted that the surface defining the floor is "ideally" generated by a ball when its center travels along the specific curves defined. However, as a practical matter the actual surface of the floor is generated with sufficient clearance to permit the balls to travel in rolling fashion therethrough.

It should be further emphasized that the criticality between the dimensions of the control surfaces defining the complex ball floor between the ducts is believed to reside in the relationship with the dimensions provided, i.e. the ball diameter, the housing diameter, the land dimensions, etc. However, it should also be emphasized that within the ratios and parameters specified, there remains a permissible range of variation within which the invention may be practiced. For example, the following is an example of a typical linear ball bearing constructed according to the invention and the relevant dimensions which may be utilized to determine the floor or the connecting paths between the ducts.

1. Ball diameter—4 mm
2. Radius of inner surface 44 of housing 12—35 mm
3. Height of land 38—1 mm
4. Diameter of primary control cylinder 48—6 mm
5. Offset dimension 60 of FIG. 7—2 mm
6. Radius of imaginary circular surface 62 shown in FIG. 8.—31 mm
7. Offset dimension 64 in FIG. 8—2 mm By defining the three part complex "floor" of the arcuate path connecting the loaded and unloaded ball ducts utilizing the above exemplary dimensions, the floor to ceiling height remains substantially constant, where the ceiling is defined as the transverse ramp 38 of land 32 and the inner surface 44 of housing 12. With the exception of primary imaginary control cylinders 48, since the dimensions of these critical surfaces are interrelated, they may be increased or reduced proportionately, within a predetermined permissible range; however, the total variation should not exceed about 10 percent. However, where a dimension is specified as ½ ball diameter or greater, variations below ½ ball diameter are not permissible since ball movement would be prevented in such event.

With respect to the primary imaginary control cylinder 48, the dimension of 1½ ball diameters is specified to provide an appropriate turning radius for the balls. Greater variations of the dimension of this control cylinder are therefore permissible provided that the diameter of the primary control cylinder is greater than the diameter of the ball. In each instance, the diameter selected will determine the turn radius of the ball path between the ducts. The preferred diameter specified, i.e. 1½ ball diameters, has been found to provide an appropriate turning radius. However, any diameter greater than 1 ball diameter may be utilized for this primary hypothetical control cylinder.

Referring now to FIGS. 9-14 there is shown a series of selective representations of the relatively complex ball paths between the loaded and unloaded ball ducts. The actual envelopes of these ball paths are shown by a series of arcuate lines which represent the progressive movement of the ball within the loaded and unloaded ducts and between these ducts.

Figure 9:
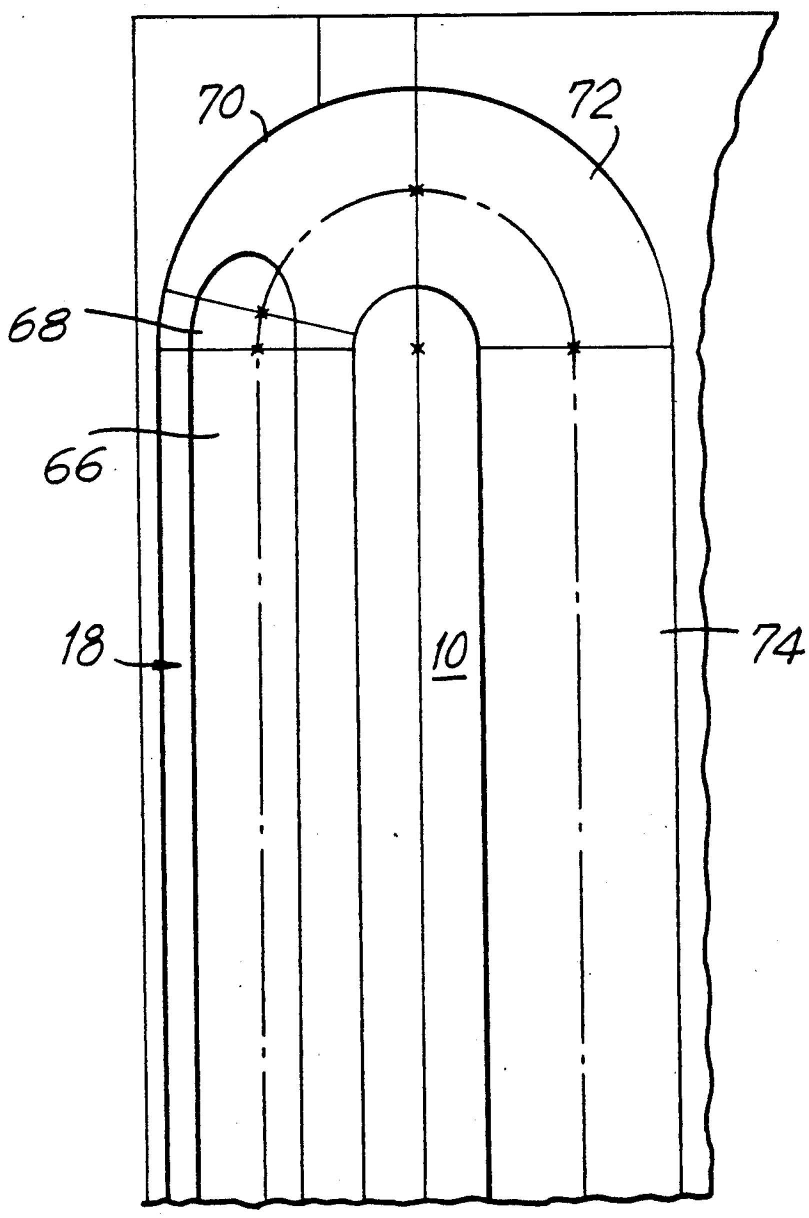
FIG. 9 is a top plan view of a portion of the ball retainer of FIG. 5, illustrating schematically a representative portion of a ball loop and a typical path of ball travel.
Figure 10:
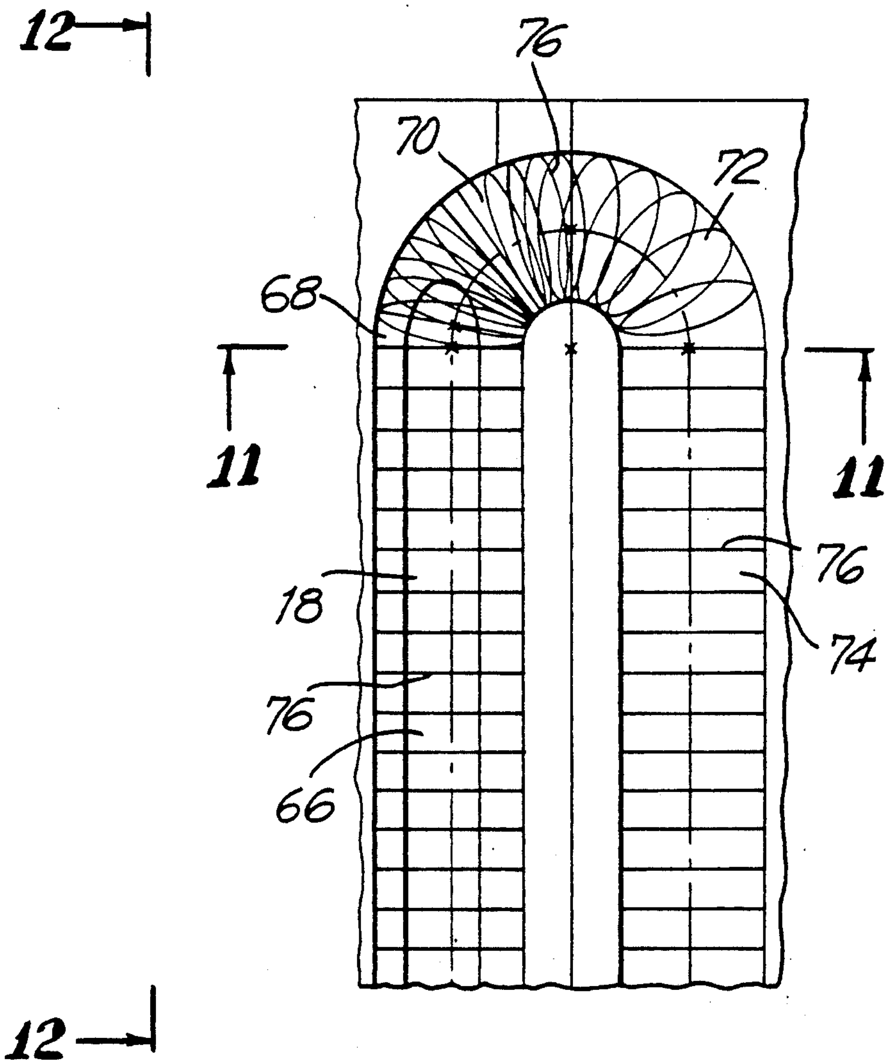
FIG. 10 is a view similar to FIG. 9, illustrating the envelope of a typical ball path between loaded and unloaded ball ducts.

For example, referring to FIGS. 9 and 10 a schematic cross-sectional view of the loaded and unloaded ball paths is shown illustrating the radially open portion 66 of the loaded ball duct 18. FIG. 10 shows ball envelope 76. The initial surface defined as the ball pick-up region is shown at 68. The second portion of the complex "floor" of the ball is shown at 70, and the third complex curved portion of the floor is shown at 72. The loaded ball zone is shown at 66 and the unloaded ball duct "floor" is shown at 74.

Figure 11:
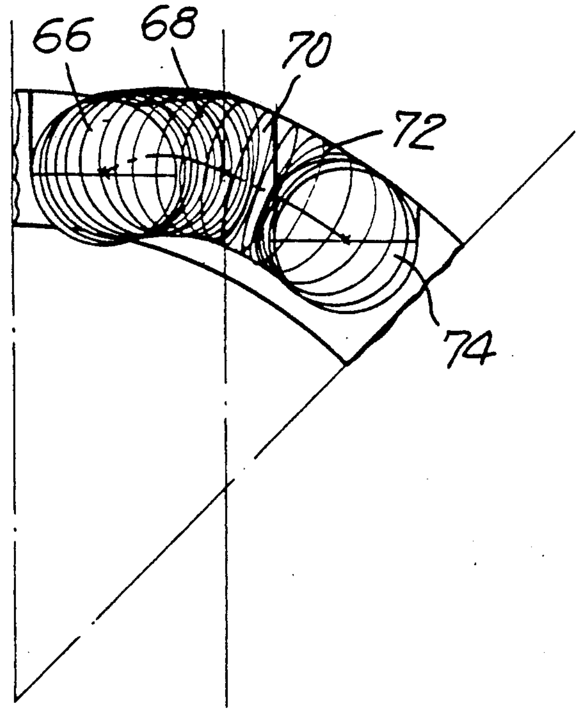
FIG. 11 is a view of the envelope of a ball in the arcuate path between the ducts taken along lines 11-11 of FIG. 10, illustrating the loaded ball duct and the unloaded ball duct of the ball retainer.
Figure 12:
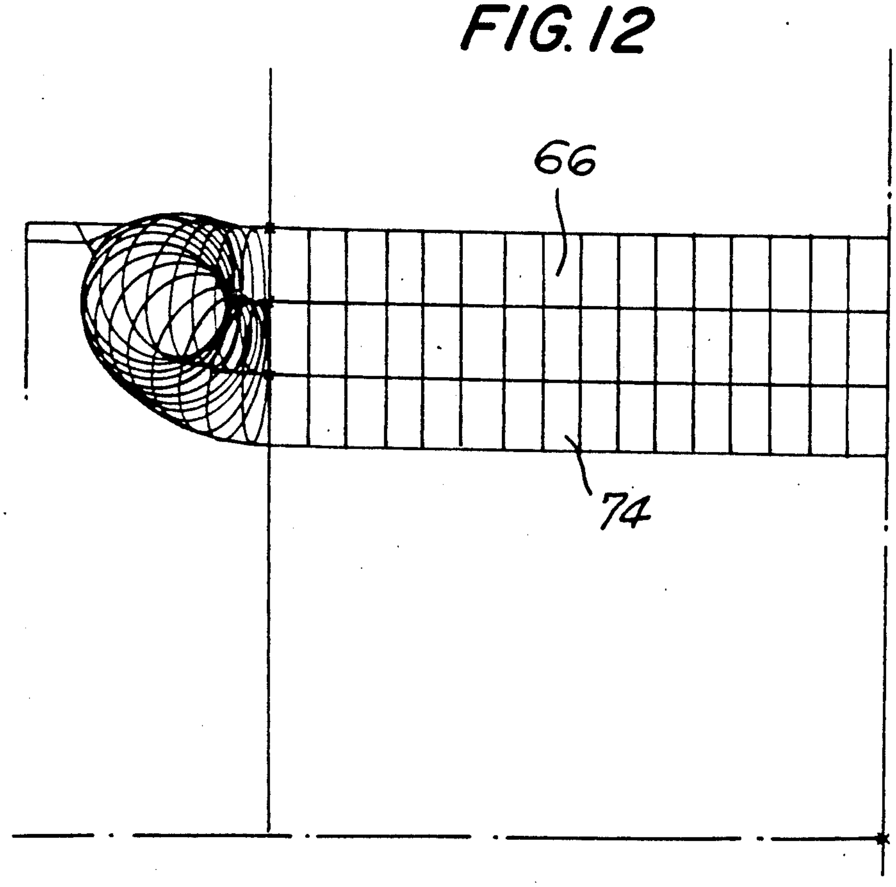
FIG. 12 is a side view illustrating the envelope of a typical ball path in the loaded and unloaded ball ducts taken along lines 12—12 of FIG. 10.
Figure 13:
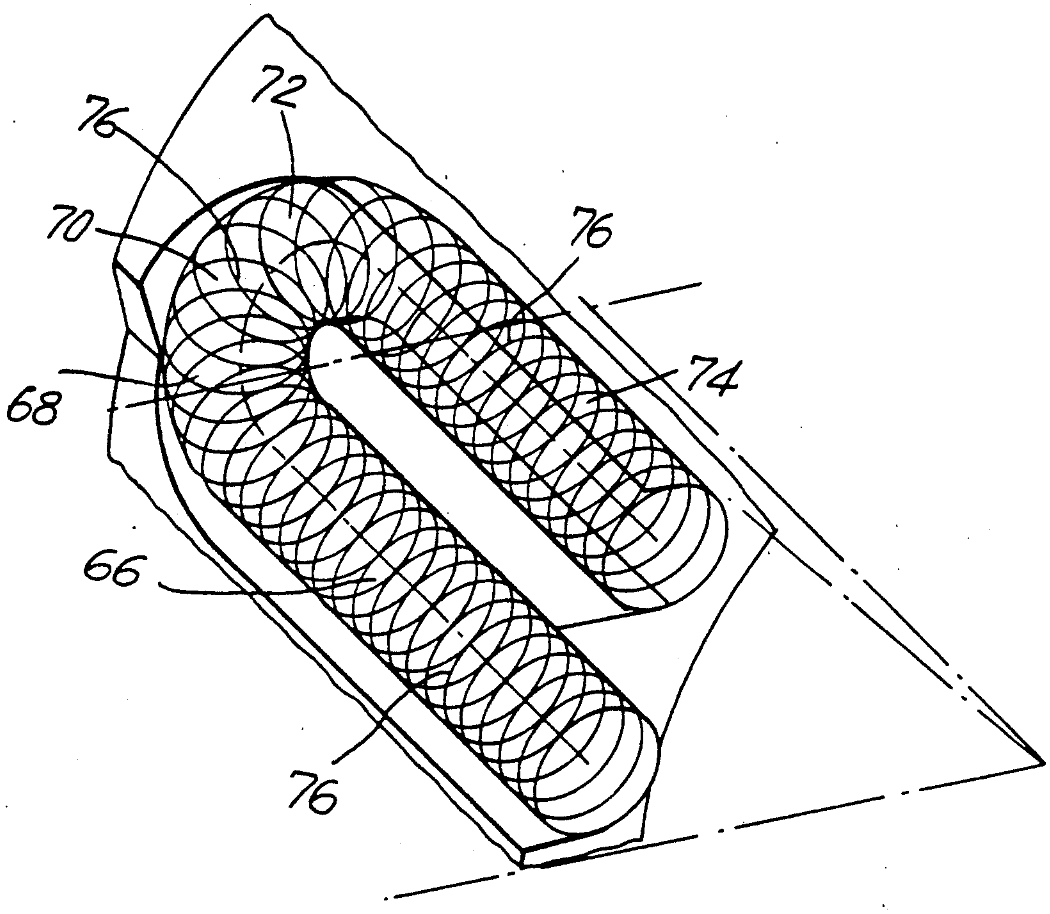
FIG. 13 is a perspective view of the envelope of a typical ball path, illustrating partially the path of a loaded ball and the path of the same ball in the unloaded ball duct.
Figure 16:
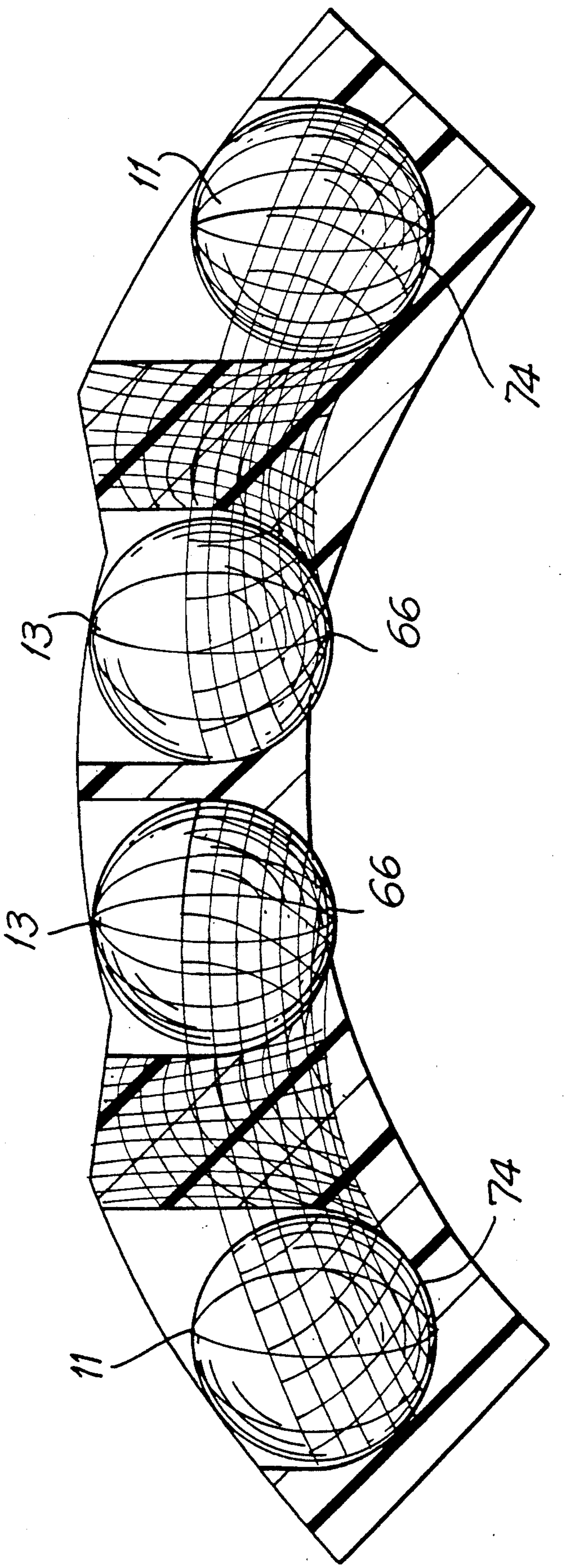
FIG. 16 is a view of a portion of the cross-sectional view of FIG. 3, greatly enlarged, illustrating the ball and the ball profile envelope in adjacent pairs of loaded and unloaded ball paths.

Referring now to FIG. 11, there is shown a view of a ball path between a loaded ball duct and an unloaded ball duct illustrating the ball envelope 76 extending from loaded ball path 66 to ball lift 68, ball ramp 70, and ball path 72 to unloaded ball path 74. FIG. 12 is a side view illustrating the ball envelope and the loaded path 66 and the unloaded path 74. FIG. 13 illustrates a perspective view of the envelope of a typical ball path between the loaded ball path 66 and the unloaded path 74. FIG. 14 is a view similar to FIG. 9 illustrating the ball envelope in the ball pick-up region 68. FIG. 15 is a cross-sectional view taken along lines 15—15 of FIG. 14 illustrating a ball in the loaded ball path 66 shown in FIG. 9 and a ball in the unloaded ball path 74 shown in FIG. 9. The darkened region 66 is an end view of the ball pick-up region 68 shown in FIG. 9. FIG. 16 is a view of a portion of the cross-sectional view of FIG. 3, greatly enlarged, illustrating the ball and the ball profile envelope in adjacent pairs of loaded ball paths 66 and unloaded ball paths 74. The relative radial ball positions are shown with the unloaded ball position in the unloaded duct being radially outward of the radial ball position in the loaded duct 18.

It has been found that a linear motion ball bearing constructed according to the invention as described, is operative in a smooth relatively quiet manner and provides improved bearing operation over the prior art.

Figure 17:
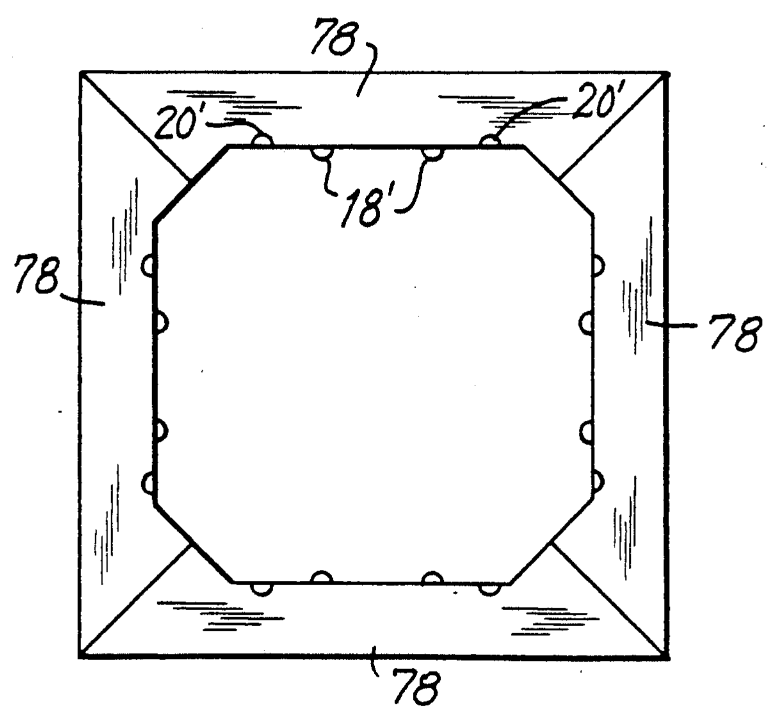
FIG. 17 is a view illustrating schematically an arrangement of four plastic molding sections for molding a typical ball retainer according to the invention, illustrating a significant advantage of the invention.

Still another benefit resulting from the present invention is obtained in connection with the actual molding process for producing the the ball retainer 28 shown in FIG. 5. This advantage is illustrated in FIG. 17 in which exemplary mold sections 78 are illustrated for molding of a plastic material in ball retainer 14. The provision of adjacent loaded ball ducts 18 surrounded by unloaded ball ducts 20 facilitate the use of four identical mold sections 78 as shown in FIG. 18 with mold portions 18' and 20' configured and dimensioned to mold the appropriate ducts. In prior arrangements which utilized alternating loaded and unloaded ball ducts it was necessary to utilize more than four mold sections. In many instances for an eight track bearing, for example, eight or more sections were needed to accommodate the repeating pattern. The present invention thus simplifies the cage molding process of the ball retainer. Further, in prior art arrangements, the outer housing necessarily contained multiple ball support lands equal to the quantity of ball tracks. Now, with four lands to support eight tracks, broching of the housing to form the lands has been simplified.

It can be seen from the description hereinabove that the present invention provides a linear motion ball bearing which is unique and superior in comparison to prior art bearings.

What is claimed is:

1. Linear motion ball bearing for providing relative linear motion in combination with a shaft, which comprises a generally cylindrical outer sleeve having an axially elongated opening extending therethrough, an axially elongated generally tubular shaped ball retainer positioned within said sleeve opening and defining a plurality of endless ball loops therein extending generally in the axial direction of said ball retainer, said ball retainer having an axial opening defined by an inner surface dimensioned for reception of a corresponding working support shaft and an outer surface, said ball loops spaced generally circumferentially apart about said ball retainer and each containing a plurality of balls, each loop having a first ball duct for a row of loaded balls and a second ball duct for a row of unloaded balls, each said first ball duct being open through the inner and outer surfaces of said cage such that said loaded balls engage said sleeve and the outer surface of said working shaft for load transmission therebetween, each said ball loop being arranged with said first ball duct next adjacent said first ball duct in the adjacent ball loop along one axially extending side and said second ball duct therein adjacent said second ball duct in the next adjacent ball loop along the other axially extending side, said sleeve defining a land opposite each pair of adjacent first ball ducts, each said land extending sufficiently radially inward and being of sufficient circumferential dimension to support said loaded balls of adjacent pairs of said first ball ducts and having a contoured relatively smooth surface for accommodating the loaded balls positioned within said corresponding opposed pair of respective first ball ducts of respectively adjacent ball loops, each relatively smooth ball support surface being connected to the inner surface portion of said outer housing by a ramped surface on at least two end portions to thereby accommodate and support ball movement between said loaded and unloaded ball ducts, a transversely extending ramped surface on each end portion of each land, each ramped surface forming an acute angle with the inner surface of said housing and extending from each land to said inner surface, each land further being surrounded on each side by a ramped surface extending from said arcuate surface to said inner wall of said housing and each loaded and unloaded ball duct being connected by an arcuate ball duct having a ball support surface comprising an arcuate ball path said ball path being defined by an arcuate ball support surface comprising at least three continuous curved surfaces which support said balls such that the center of the ball approximately defines a locus comprised of three correspondingly continuous curves approximately as follows:

(a) a first curve defined by the intersection closest to said land and of a first imaginary control cylinder of diameter at least approximately one ball diameter and its central axis extending generally perpendicular to the chord of each land end, and a second imaginary control cylinder of diameter approximately one ball diameter and having its central axis tangential to the loaded ball surface of each land and generally orthogonal to the central axis of said outer sleeve;

(b) a second curve defined by the intersection of a conical surface concentric with said transversely extending end ramp and closest thereto and spaced orthogonally inward therefrom approximately ½ ball diameter, and said first mentioned imaginary control cylinder; and (c) a third curve defined by the intersection closest to said land of a cylindrical surface concentric with the inner surface of said housing and spaced radially inward therefrom approximately ½ ball diameter, and said first mentioned imaginary control cylinder.

2. Linear motion ball bearing for providing relative linear motion in combination with a shaft, which comprises housing means having an axially elongated opening therethrough, an axially elongated generally tubular shaped ball retaining means positioned within said housing means opening and defining a plurality of endless ball loops therein extending generally in the axial direction of said ball retaining means, said ball retaining means having an inner surface and an outer surface radially displaced from one another, said ball loops spaced circumferentially apart about said ball retaining means and each containing a plurality of balls, each loop having a first loaded ball duct for a row of loaded balls and a second unloaded ball duct for a row of unloaded balls, each said first loaded ball duct being open through the inner and outer surfaces of said ball retaining means to permit contact between said balls and the shaft, each said second unloaded ball duct being closed, each ball loop being arranged with said first loaded ball duct next adjacent said first loaded ball duct in the adjacent ball loop along one axially extending side and said second unloaded ball duct therein adjacent said second unloaded ball duct in the next adjacent ball loop along the other axially extending side, said housing defining a land opposite each pair of adjacent first loaded ball ducts and extending inwardly, each said land extending sufficiently inwardly and being of sufficient circumferential dimension such that each land supports said loaded balls of an adjacent pair of said first loaded ball ducts and having a contoured relatively smooth continuous arcuate surface for contact with said loaded balls positioned within said corresponding opposed pair of respective first loaded ball ducts of respective adjacent ball loops to transmit load between said lands and the shaft while said closed second ball ducts prevent contact between said balls and the shaft.

3. The linear motion ball bearing according to claim 1, wherein each said land for supporting loaded balls is dimensioned and configured such that balls in adjacent loaded ball ducts become unloaded upon movement away from each said first ball duct and toward the second ball duct of the respective ball loop.

4. The linear motion ball bearing according to claim 3 wherein each said ball support land is formed integral with said housing.

5. The linear motion ball bearing according to claim 4 wherein each said ball support land is configured to define an arcuate central portion to support loaded balls and ramp portions extending from said arcuate portion towards the wall of said housing at least at each axial end portion.

6. The linear motion ball bearing according to claim 5 wherein each said ball support land is of a length generally greater than the width.

7. The linear motion ball bearing according to claim 6 wherein said arcuate loaded ball surface extends from said inner surface of said outer housing and defines ramped surfaces extending axially at least along the length of each land.

8. The linear motion ball bearing according to claim 7 wherein each ramp portion adjacent the width portion of each land extends in a transverse direction and from the ball support surface toward the inner surface portion of said housing and forms a generally acute angle with said inner surface portion of said housing.

9. The linear motion ball bearing according to claim 8 wherein each loaded ball duct defines a loaded ball zone approximately equal in length to the corresponding open portion extending from said radially inner to said radially outer surface of said cage.

10. The linear motion ball bearing according to claim 9 wherein the interface between each said loaded ball surface portion of each land and said adjacent transverse ramp portion corresponds generally with the end of said loaded ball zone.

11. The linear motion ball bearing according to claim 10 wherein the cross-section of each ball duct is generally arcuate, preferably semi-circular and is related to the diameter of each said ball.

12. The linear motion ball bearing according to claim 11 wherein said ball retaining means is a ball cage having ramped surfaces configured for engagement with each axially extending ramp adjacent the longer side of each land so as to fix the circumferential position of said cage within said outer housing.

13. The linear motion ball bearing according to claim 12 wherein each ball duct portion beyond the open portion of said loaded ball duct is contoured such that each ball first rises to a level radially outward of said loaded ball land surface beyond the end portions of each loaded ball duct.

14. The linear motion ball bearing according to claim 13 wherein said ball cage is fabricated of a polymeric material.

15. Linear motion ball bearing for providing relative linear motion in combination with a shaft, which comprises a housing having an axially elongated opening therethrough, an axially elongated generally tubular shaped ball retainer positioned within said housing opening and defining a plurality of endless ball loops therein extending generally in the axial direction of said ball retainer, said ball retainer having an inner surface and an outer surface radially displaced from one another, said ball loops spaced circumferentially apart about said ball retainer and each containing a plurality of balls, each loop having a first generally axially extending loaded ball duct for a row of loaded balls and a second generally axially extending unloaded ball duct for a row of unloaded balls, each said first loaded ball duct being open through the inner and outer surfaces of said ball retainer to permit contact between said balls and the shaft, each said ball loop being arranged with said first loaded ball duct next adjacent said first loaded ball duct in the adjacent ball loop along one axially extending side and said second unloaded ball duct therein adjacent said second unloaded ball duct in the next adjacent ball loop along the other axially extending side, said housing defining a land opposite each pair of adjacent first ball ducts extending inwardly and integral therewith, each said land extending sufficiently inwardly and being of sufficient circumferential dimension such that each land supports said loaded balls of an adjacent pair of said first loaded ball ducts and having a contoured relatively smooth continuous arcuate surface for contact with said loaded balls positioned within said corresponding opposed pair of respective first ball ducts of respectively adjacent ball loops, each relatively smooth ball support continuously arcuate surface being connected to the inner surface portion of said outer housing by a ramped surface on at least two end portions to thereby accommodate and support ball movement between said first loaded and second unloaded ball ducts, each first and second ball ducts being connected by a surface opposite said ramped surface, which connecting surface combines with said respective opposed ramped surface to provide substantially constant clearance for said balls between said ramped surface and said connecting surface as they travel between the first loaded and second unloaded ball ducts.

16. Linear motion ball bearing for providing relative linear motion in combination with a shaft, which comprises a housing having an axially elongated opening therethrough and defining an inner wall having a circular cross-section, an axially elongated generally tubular shaped retainer positioned within said housing opening and defining a plurality of endless ball loops therein extending generally in the axial direction of said ball retainer, said ball loops spaced generally circumferentially apart about said ball retainer and each containing a plurality of balls, each loop having a first ball duct for a row of loaded balls and a second ball duct for a row of unloaded balls, each said first ball duct being open through the inner surface of said ball retainer, each said ball loop being arranged with said first ball duct next adjacent said first ball duct in the adjacent ball loop along one axially extending side and said second ball duct therein adjacent said second ball duct in the next adjacent ball loop along the other axially extending side, said housing defining a land opposite each pair of adjacent first ball ducts and extending radially inward, each said land being elongated and extending sufficiently radially inward and being of sufficient circumferential dimension to support said loaded balls of adjacent pairs of said first ball ducts and having a contoured relatively smooth arcuate surface for accommodating the loaded balls positioned within said corresponding opposed pair of respective first ball ducts of respectively adjacent ball loops, each land being surrounded on each elongated side and on each end portion by a ramped surface extending from said arcuate surface to said inner wall of said housing and forming an acute angle therewith, each loaded and unloaded ball duct being connected by an arcuate ball duct having a ball support surface comprising an arcuate ball path, said ball path being defined by an arcuate ball support surface comprising at least three continuous curved surfaces which support said balls such that the center of the ball approximately defines a locus comprised of three correspondingly continuous curves approximately as follows:

(a) a first curve defined by the intersection closest to said land end of a first imaginary control cylinder of diameter at least approximately 1 and ½ ball diameters and its central axis extending generally perpendicular to the chord of each land end, and a second imaginary control cylinder of diameter approximately one ball diameter and having its central axis tangential to the loaded ball surface of each land and generally orthogonal to the central axis of said housing;

(b) a second curve defined by the intersection of a third imaginary conical surface concentric with said transversely extending end ramp and closest thereto and spaced orthogonally inward therefrom approximately ½ ball diameter, and said first mentioned imaginary control cylinder; and (c) a third curve defined by the intersection closest to said land of a fourth imaginary cylindrical surface concentric with the inner surface of said housing and spaced radially inward therefrom approximately ½ ball diameter, and said first mentioned imaginary control cylinder.

17. The linear motion ball bearing according to claim 16 wherein said retainer is molded of an engineering polymeric material and said symmetrical arrangement of ball loops facilitates symmetrical and convenient molding of said retainer by generally symmetrical molding sections.

* * * * *

UNITED STATES PATENT AND TRADEMARK OFFICE
CERTIFICATE OF CORRECTION

PATENT NO. : 5,046,862

DATED : September 10, 1991

INVENTOR(S) : Alison Ng

It is certified that error appears in the above-identified patent and that said Letters Patent is hereby corrected as shown below:

Column 12, line 52, change "1" to --2--.

Signed and Sealed this

Second Day of November, 1993

Attest:

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,046,862
DATED : September 10, 1991
INVENTOR(S) : Alison Ng

It is certified that error appears in the above-indentified patent and that said Letters Patent is hereby corrected as shown below:

On the title page, Item [56] add following after "4,327,949 5/1982 Borel". --

| | | |
|---|---|---|
| 2,503,009 | 04/50 | Thomson |
| 2,509,749 | 05/50 | Thomson |
| 2,576,269 | 11/51 | Thomson |
| 2,628,135 | 02/53 | Magee |
| 3,190,703 | 06/65 | Thomson et al. |
| 3,844,629 | 10/74 | Haines |
| 3,951,472 | 04/76 | Schurger et al. |
| 3,967,865 | 07/76 | Walter et al. |
| 4,005,913 | 02/77 | Thomson, Jr. |
| 4,227,751 | 10/80 | Albert |
| 4,541,674 | 09/85 | Mitschang |
| 4,553,796 | 11/85 | Walter et al. |
| 4,715,729 | 12/87 | Tanaka |
| 4,932,793 | 06/90 | Milanov et al. |

Other Publications
NB Ball Splines Japanese Language Publication--.

Signed and Sealed this

Twenty-eighth Day of December, 1993

Attest:

BRUCE LEHMAN

Attesting Officer

Commissioner of Patents and Trademarks